United States Patent
Madala et al.

(10) Patent No.: US 11,243,757 B2
(45) Date of Patent: Feb. 8, 2022

(54) SYSTEMS AND METHODS FOR EFFICIENT FIRMWARE UPDATE OF MEMORY DEVICES IN BIOS/UEFI ENVIRONMENT

(71) Applicant: Dell Products L.P., Round Rock, TX (US)

(72) Inventors: Raveendra Babu Madala, Banglore (IN); Sumanth Vidyadhara, Bangalore (IN); Santosh Gore, Bangalore (IN); Vijay Bharat Nijhawan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/208,117

(22) Filed: Dec. 3, 2018

(65) Prior Publication Data
US 2020/0174772 A1 Jun. 4, 2020

(51) Int. Cl.
*G06F 8/65* (2018.01)
*G06F 8/61* (2018.01)

(52) U.S. Cl.
CPC . *G06F 8/65* (2013.01); *G06F 8/61* (2013.01)

(58) Field of Classification Search
CPC .................................... G06F 8/61; G06F 8/65
USPC ....................................................... 717/168
See application file for complete search history.

(56) References Cited

U.S. PATENT DOCUMENTS

| | | | | |
|---|---|---|---|---|
| 5,596,713 A * | 1/1997 | DeRoo | ................ | G06F 9/30101 711/103 |
| 5,872,967 A * | 2/1999 | DeRoo | ................ | G06F 9/30101 711/E12.083 |
| 6,009,495 A * | 12/1999 | DeRoo | ................ | G06F 9/30101 711/103 |
| 6,205,548 B1 * | 3/2001 | Hasbun | ..................... | G06F 8/65 711/170 |
| 6,282,675 B1 * | 8/2001 | Sun | ..................... | G06F 11/1417 713/2 |
| 6,711,675 B1 * | 3/2004 | Spiegel | ................. | G06F 9/4401 713/164 |
| 7,213,152 B1 * | 5/2007 | Gafken | ..................... | G06F 8/65 713/187 |
| 7,425,992 B2 * | 9/2008 | Feeler | ................ | H04N 21/4432 348/552 |
| 7,725,890 B2 * | 5/2010 | Kawaura | ................ | G06K 15/00 717/168 |

(Continued)

*Primary Examiner* — Lewis A Bullock, Jr.
*Assistant Examiner* — Theodore E Hebert
(74) *Attorney, Agent, or Firm* — Jackson Walker L.L.P.

(57) ABSTRACT

A method, and systems and articles of manufacture for performing the method, may be provided for use in an information handling system comprising one or more processors and a memory system communicatively coupled to the one or more processors. The method may include enumerating memory modules of the memory system and installing a concurrent firmware protocol to each of the memory modules, wherein the concurrent firmware protocol is configured to individually execute an update routine on each of the memory modules. The update routine may be configured to, on each memory module, store a to-be-applied firmware update in a protected non-volatile region of the memory module and pull the to-be-applied firmware update from the protected non-volatile region of the memory module and perform a self-update of firmware for the memory module.

15 Claims, 3 Drawing Sheets

(56) References Cited

U.S. PATENT DOCUMENTS

| | | | | |
|---|---|---|---|---|
| 8,607,219 | B2* | 12/2013 | Minegishi | G06F 8/65 |
| | | | | 717/168 |
| 9,542,195 | B1* | 1/2017 | Astarabadi | G06F 9/4401 |
| 2003/0095648 | A1* | 5/2003 | Kaib | A61B 5/0006 |
| | | | | 379/106.02 |
| 2004/0003226 | A1* | 1/2004 | Collins | G06F 11/1417 |
| | | | | 713/2 |
| 2006/0015861 | A1* | 1/2006 | Takata | G06F 8/656 |
| | | | | 717/168 |
| 2006/0179308 | A1* | 8/2006 | Morgan | G06F 21/575 |
| | | | | 713/168 |
| 2008/0126784 | A1* | 5/2008 | Iima | G06F 11/1433 |
| | | | | 713/2 |
| 2010/0205470 | A1* | 8/2010 | Moshayedi | G11C 5/141 |
| | | | | 713/340 |
| 2011/0179407 | A1* | 7/2011 | Minegishi | G06F 8/65 |
| | | | | 717/170 |
| 2013/0138866 | A1* | 5/2013 | Asfur | G06F 12/02 |
| | | | | 711/103 |
| 2014/0258699 | A1* | 9/2014 | Hsu | G06F 11/1417 |
| | | | | 713/2 |
| 2015/0370653 | A1* | 12/2015 | Scott | G06F 11/1451 |
| | | | | 714/19 |
| 2016/0330175 | A1* | 11/2016 | Li | H04L 63/0853 |
| 2017/0040057 | A1* | 2/2017 | Cho | G06F 13/16 |
| 2017/0131991 | A1* | 5/2017 | Su | G06F 8/654 |
| 2017/0293520 | A1* | 10/2017 | Onniyil | G06F 9/4416 |
| 2017/0329598 | A1* | 11/2017 | Hobson | G06F 1/206 |
| 2019/0243631 | A1* | 8/2019 | Sharma | G06F 21/572 |
| 2020/0073580 | A1* | 3/2020 | Frolikov | G06F 3/0655 |

* cited by examiner

FIG. 1

SYSTEMS AND METHODS FOR EFFICIENT FIRMWARE UPDATE OF MEMORY DEVICES IN BIOS/UEFI ENVIRONMENT

TECHNICAL FIELD

The present disclosure relates in general to information handling systems, and more particularly to systems and methods for providing efficient firmware update of memory devices, including memory embodied in Non-Volatile Dual-in Line Memory Modules (NVDIMMs), in a basic input/output system (BIOS)/Unified Extensible Firmware Interface (UEFI) environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Unified Extensible Firmware Interface (UEFI) is typically single-threaded, and accordingly, UEFI typically sequentially applies firmware updates to components of an information handling system. At times, multiple instances of the same device, such as a Non-Volatile Dual-in Line Memory Module (NVDIMM) or other memory module, may exist within an information handling system, and because UEFI applies firmware updates sequentially, an overall update to firmware of components of an information handling system may take significant time, leading to undesirable system downtime.

SUMMARY

In accordance with the teachings of the present disclosure, the disadvantages and problems associated with firmware updates of memory of an information handling system may be reduced or eliminated.

In accordance with embodiments of the present disclosure, an information handling system may include one or more processors, a memory system communicatively coupled to the one or more processors, and a program of instructions embodied in non-transitory computer readable media. The program of instructions may be configured to, when read and executed by the one or more processors, enumerate memory modules of the memory system and install a concurrent firmware protocol to each of the memory modules, wherein the concurrent firmware protocol is configured to individually execute an update routine on each of the memory modules. The update routine may be configured to, on each memory module, store a to-be-applied firmware update in a protected non-volatile region of the memory module and pull the to-be-applied firmware update from the protected non-volatile region of the memory module and perform a self-update of firmware for the memory module.

In accordance with these and other embodiments of the present disclosure, a method may be provided for use in an information handling system comprising one or more processors and a memory system communicatively coupled to the one or more processors. The method may include enumerating memory modules of the memory system and installing a concurrent firmware protocol to each of the memory modules, wherein the concurrent firmware protocol is configured to individually execute an update routine on each of the memory modules. The update routine may be configured to, on each memory module, store a to-be-applied firmware update in a protected non-volatile region of the memory module and pull the to-be-applied firmware update from the protected non-volatile region of the memory module and perform a self-update of firmware for the memory module.

In accordance with these and other embodiments of the present disclosure, an article of manufacture may include a non-transitory computer-readable medium and computer-executable instructions carried on the computer-readable medium, the instructions readable by a processor. The instructions, when read and executed, may cause the processor to, in an information handling system comprising one or more processors and a memory system communicatively coupled to the one or more processors, enumerate memory modules of the memory system and install a concurrent firmware protocol to each of the memory modules, wherein the concurrent firmware protocol is configured to individually execute an update routine on each of the memory modules. The update routine may be configured to, on each memory module, store a to-be-applied firmware update in a protected non-volatile region of the memory module and pull the to-be-applied firmware update from the protected non-volatile region of the memory module and perform a self-update of firmware for the memory module.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
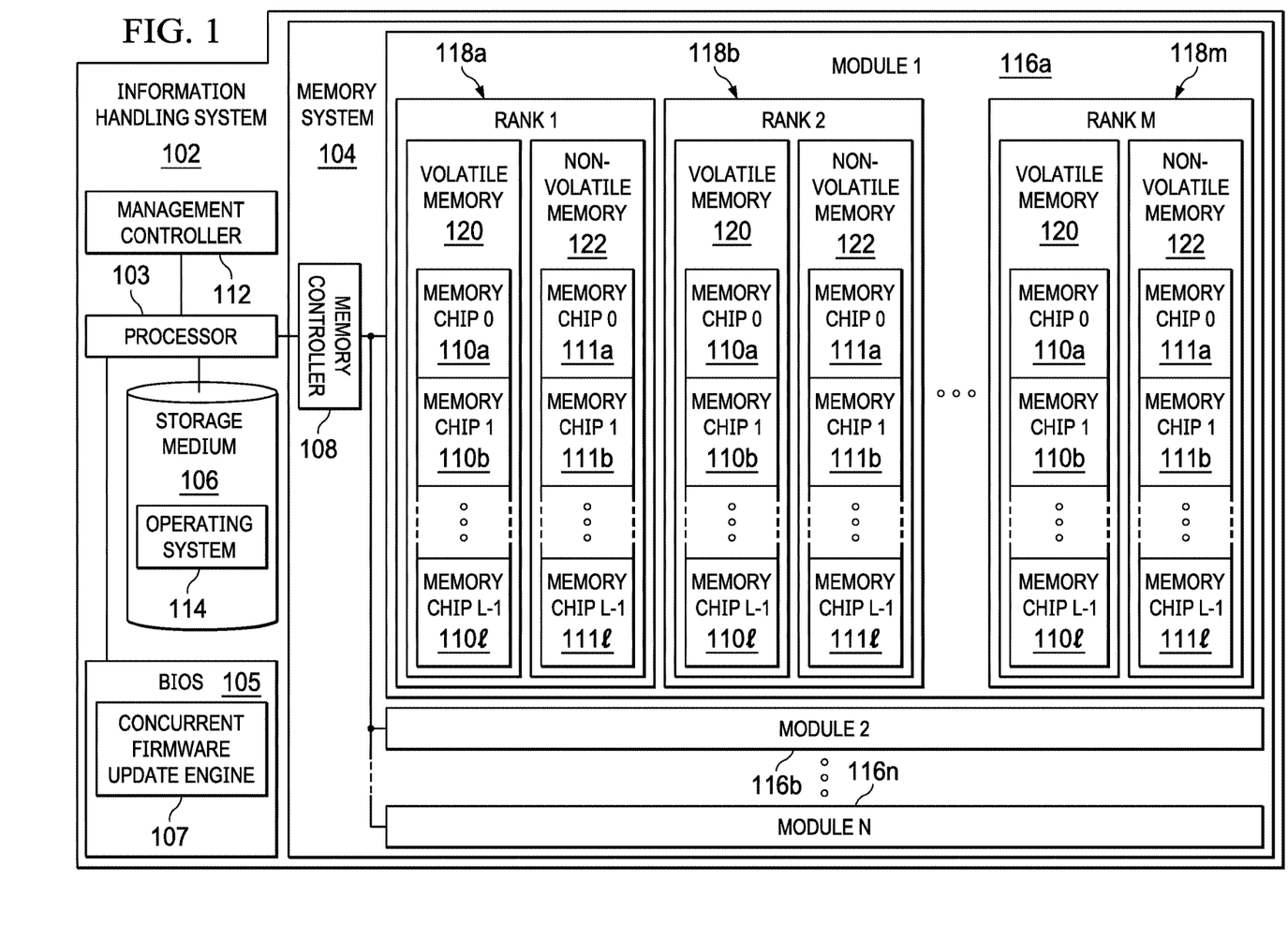
FIG. 1 illustrates a block diagram of an example information handling system in accordance with embodiments of the present disclosure.

FIG. 1 illustrates a block diagram of an example information handling system 102 in accordance with certain embodiments of the present disclosure. In certain embodiments, information handling system 102 may comprise a computer chassis or enclosure (e.g., a server chassis holding one or more server blades). In other embodiments, information handling system 102 may be a personal computer (e.g., a desktop computer or a portable computer). As depicted in FIG. 1, information handling system 102 may include a processor 103, a memory system 104 communicatively coupled to processor 103, a basic input/output system (BIOS) 105 communicatively coupled to processor 103, a storage medium 106 communicatively coupled to processor 103, and a management controller 112 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored and/or communicated by one or more of memory system 104, BIOS 105, storage medium 106, and/or another component of information handling system 102.

Memory system 104 may be communicatively coupled to processor 103 and may comprise any system, device, or apparatus operable to retain program instructions or data for a period of time (e.g., computer-readable media). Memory system 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In particular embodiments, memory system 104 may comprise a persistent memory (e.g., comprising one or more NVDIMMs) that includes volatile memory (e.g., DRAM or other volatile random-access memory) and non-volatile memory (e.g., flash memory or other non-volatile memory), as described in greater detail below.

As shown in FIG. 1, memory system 104 may include memory controller 108 and one or more memory modules 116a-116n communicatively coupled to memory controller 108. Memory controller 108 may be any system, device, or apparatus configured to manage and/or control memory system 104. For example, memory controller 108 may be configured to read data from and/or write data to memory modules 116 comprising memory system 104. Additionally or alternatively, memory controller 108 may be configured to refresh memory modules 116 and/or memory chips 110 thereof in embodiments in which memory system 104 (or a portion thereof) comprises DRAM. Although memory controller 108 is shown in FIG. 1 as an integral component of memory system 104, memory controller 108 may be separate from memory system 104 and/or may be an integral portion of another component of information handling system 102 (e.g., memory controller 108 may be integrated into processor 103).

Each memory module 116 may include any system, device or apparatus configured to retain program instructions and/or data for a period of time (e.g., computer-readable media). As shown in FIG. 1, a memory module 116 may comprise a persistent memory (e.g., NVDIMM) comprising volatile memory 120 and non-volatile memory 122. In particular embodiments, a memory module 116 may comprise an NVDIMM-N implementation, in which volatile memory 120 and non-volatile memory 122 exist on the same memory module 116, and a memory module 116 may present only volatile memory 120 to OS 114, and any save operations that are performed invisibly to OS 114 in the event of a power loss. As depicted in FIG. 1, each memory module 116 may include one or more ranks 118a-118m. Each memory rank 118 within a memory module 116 may be a block or area of data created using some or all of the memory capacity of the memory module 116. In some embodiments, each rank 118 may be a rank as such term is defined by the JEDEC Standard for memory devices.

As shown in FIG. 1, each rank 118 may include a non-volatile memory 120 and an associated non-volatile memory 122. Each rank-level volatile memory 120 may include a plurality of memory chips 110, and each rank-level non-volatile memory 122 may include a plurality of memory chips 111. Each memory chip 110 may include a packaged integrated circuit configured to comprise a plurality of volatile memory cells for storing data. In some embodiments, a memory chip 110 may include dynamic random access memory (DRAM). Each memory chip 111 may include a packaged integrated circuit configured to comprise a plurality of non-volatile memory cells for storing data. In some embodiments, a memory chip 111 may include flash memory.

During normal operation, when an electrical power source provides adequate power to components of information handling system 102, data written to memory 104 from processor 103 may be stored in volatile memory 120. However, in the event of loss of system input power or a power fault that prevents delivery of electrical energy from the power source to memory 104, data stored in volatile memory 120 may be transferred to non-volatile memory 122 in a save operation. After input power is restored, or a faulty power source is replaced, such that the power source is again operable to provide electrical energy to information handling resources of information handling system 102, on the subsequent power-on of information handling system 102, data may be copied from non-volatile memory 122 back to volatile memory 120 via a restore operation. The combined actions of data save and then data restore, allow the data to remain persistent through a power disruption. Accordingly, although not explicitly shown in FIG. 1, memory 104 may also include hardware, firmware, and/or software for carrying out save operations.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

As shown in FIG. 1, BIOS 105 may include a concurrent firmware update engine 107. Concurrent firmware update engine 107 may be any program of executable instructions, or aggregation of programs of executable instructions, configured to manage and/or control the concurrent update of firmware for memory modules 116 of memory system 104, as described in greater detail below. In some embodiments, active portions of concurrent firmware update engine 107 may be transferred to memory system 104 for execution by processor 103.

Storage medium 106 may be communicatively coupled to processor 103. Storage medium 106 may include any system, device, or apparatus operable to store information processed by processor 103. Storage medium 106 may include, for example, network attached storage, one or more direct access storage devices (e.g., hard disk drives), and/or one or more sequential access storage devices (e.g., tape drives). As shown in FIG. 1, storage medium 106 may have stored thereon an operating system (OS) 114. OS 114 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 114. Active portions of OS 114 may be transferred to memory system 104 for execution by processor 103.

Management controller 112 may be configured to provide management facilities for management of information handling system 102. Such management may be performed by management controller 112 even if information handling system 102 is powered off or powered to a standby state. Management controller 112 may include a processor and a management network interface separate from and physically isolated from a data network interface of information handling system 102. In certain embodiments, management controller 112 may include or may be an integral part of a baseboard management controller (BMC) or a remote access controller (e.g., a Dell Remote Access Controller or Integrated Dell Remote Access Controller).

In addition to processor 103, memory system 104, BIOS 105, storage medium 106, and management controller 112, information handling system 102 may include one or more other information handling resources.

In addition, for the purposes of clarity and exposition, information handling system 102 is shown having a single processor coupled to memory system 104. However, in some embodiments, information handling system 102 may have a plurality of processors 103, each processor 103 residing within a respective Non-Uniform Memory Access (NUMA) domain comprising a respective portion of memory modules 116 of memory system 104.

Further, for the purposes of clarity and exposition, memory system 104 is shown as comprising NVDIMM-N modules 116. However, it is understood that memory system 104 may comprise memory implementations other than NVDIMM-N.

In operation, concurrent firmware update engine 107 may manage a self-initiated update method whereby for each memory module 116, an updated firmware image is pulled from a specific protected and non-volatile region of the memory module 116 and applied to the memory module itself whenever a firmware update routine is called by BIOS 105. As explained in more detail below, a concurrent update protocol may be installed on each memory module 116 by BIOS 105. Using such protocol, various memory modules 116 may be classified and/or grouped by vendor, type, and/or other characteristic. Once the grouping is done, a routine of the concurrent update protocol may copy a to-be-applied firmware update to a protected and non-volatile region which is not accessible by operating system 114 and may install a timer driven task. The timer may initiate and update on each handle for memory modules 116 as a firmware management protocol (FMP) update method in order to initiate firmware update on all FMP handles. Each FMP handle may return an event notification upon completion of firmware update to concurrent firmware update engine 107. On completion of the updates, a table of BIOS 105 (e.g., an EFI System Resource Table or "ESRT") may be updated with an updated status for each memory module, including, without limitation, an indication of the updated firmware version.

Figures 2, 3:
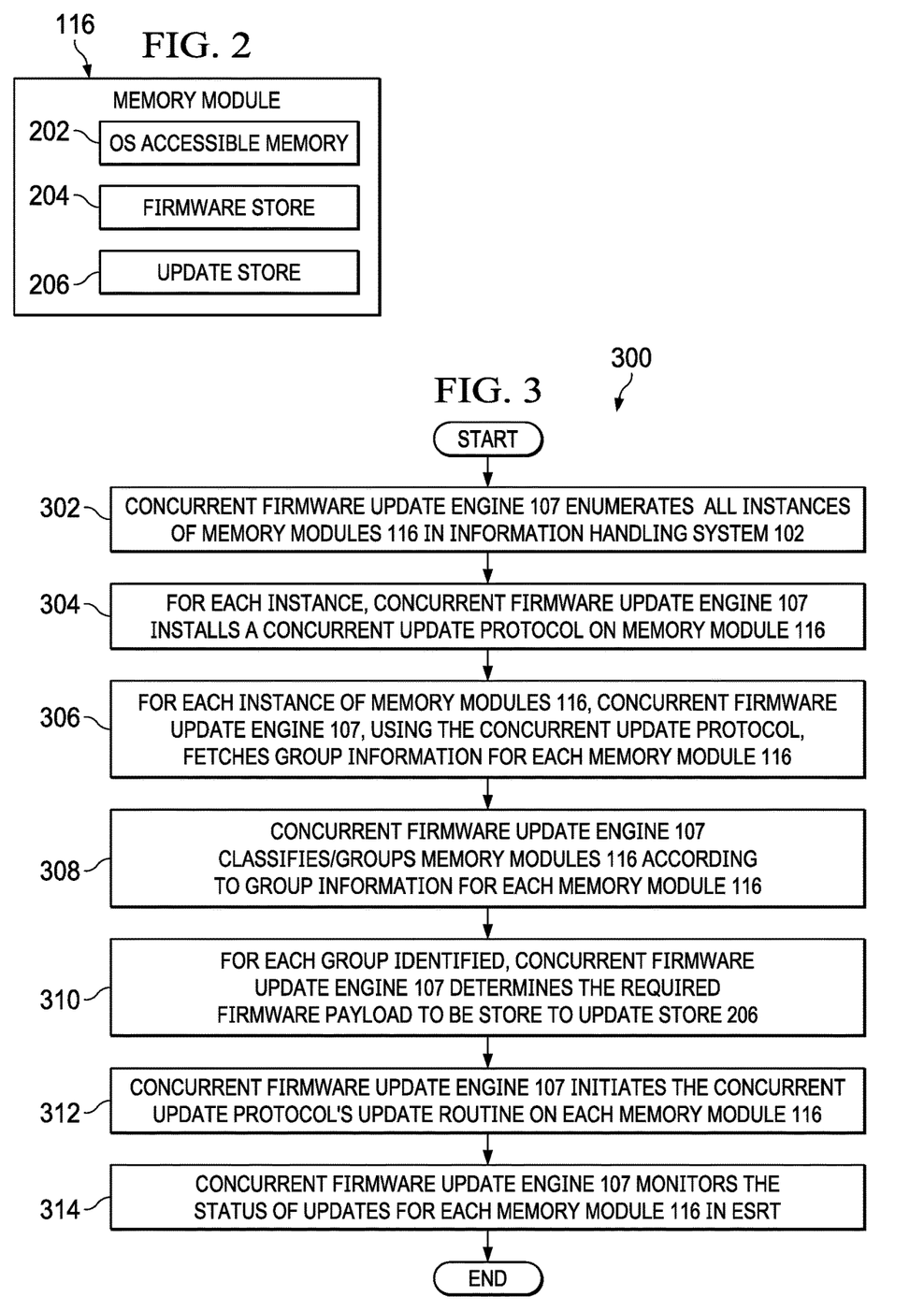
FIG. 2 illustrates a block diagram showing example memory regions of an example memory module in accordance with embodiments of the present disclosure.
FIG. 3 illustrates a flow chart of an example method for installing a concurrent update protocol for each memory module of an information handling system, in accordance with embodiments of the present disclosure.

FIG. 2 illustrates a block diagram showing example memory regions of an example memory module 116 in accordance with embodiments of the present disclosure. As shown in FIG. 2, memory module 116 may include OS-accessible memory 202, firmware store 204, and update store 206.

OS-accessible memory 202 of a memory module 116 may comprise a region of memory of memory module 116, which may include almost all of the memory of memory module 116, which operating system 114 may use for storing instructions and/or data for execution of operating system 114 or applications running upon operating system 114.

Firmware store 204 may comprise a region of non-volatile memory of memory module 116 which may store a current version of firmware for memory module 116 which memory module 116 may use to carry out its functionality.

Update store 206 may comprise a region of non-volatile protected memory which may store a to-be-applied firmware update to firmware stored in firmware store 204, as described in greater detail below.

FIG. 3 illustrates a flow chart of an example method 300 for installing a concurrent update protocol for each memory module 116 of information handling system 102, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, concurrent firmware update engine 107 may enumerate all instances of memory modules 116 in information handling system 102. At step 304, for each instance, concurrent firmware update engine 107 may install a concurrent update protocol on such memory module 116. The concurrent update protocol may be capable of acquiring a Firmware Management Protocol (FMP) handle of a memory module 116 on which it is installed, firmware version information of the memory module 116 on which it is installed, EFI System Resource Table (ESRT) information stored in UEFI relating to the memory module 116 on which it is installed, and group information (e.g., vendor, model, etc.) relating to the memory module 116 on which it is installed. The concurrent update protocol may also be capable of accessing update store 206 of the memory module 116 on which it is installed.

At step 306, for each instance of memory modules 116, concurrent firmware update engine 107 may, using the concurrent update protocol, fetch the group information for each memory module 116. At step 308, concurrent firmware update engine 107 may classify/group memory modules 116 according to the group information for each memory module 116. For example, all memory modules 116 having the same vendor and model number may be grouped together in a single group.

At step 310, for each group identified at step 308 above, concurrent firmware update engine 107 may determine the required firmware payload to be stored to update store 206. At step 312, concurrent firmware update engine 107 may initiate the concurrent update protocol's update routine on each memory module 116. The concurrent update protocol's update routine is discussed in greater detail in reference to FIG. 4 below.

At step 314, concurrent firmware update engine 107 may monitor the status of the updates for each memory module 116 in ESRT. When all instances of memory modules 116 have been updated, step 314 and method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented in whole or part using concurrent firmware update engine 107, and/or any other system operable to implement method 300. In certain embodiments, method 300 may be implemented partially or fully in software and/or firmware embodied in computer-readable media.

Figure 4:
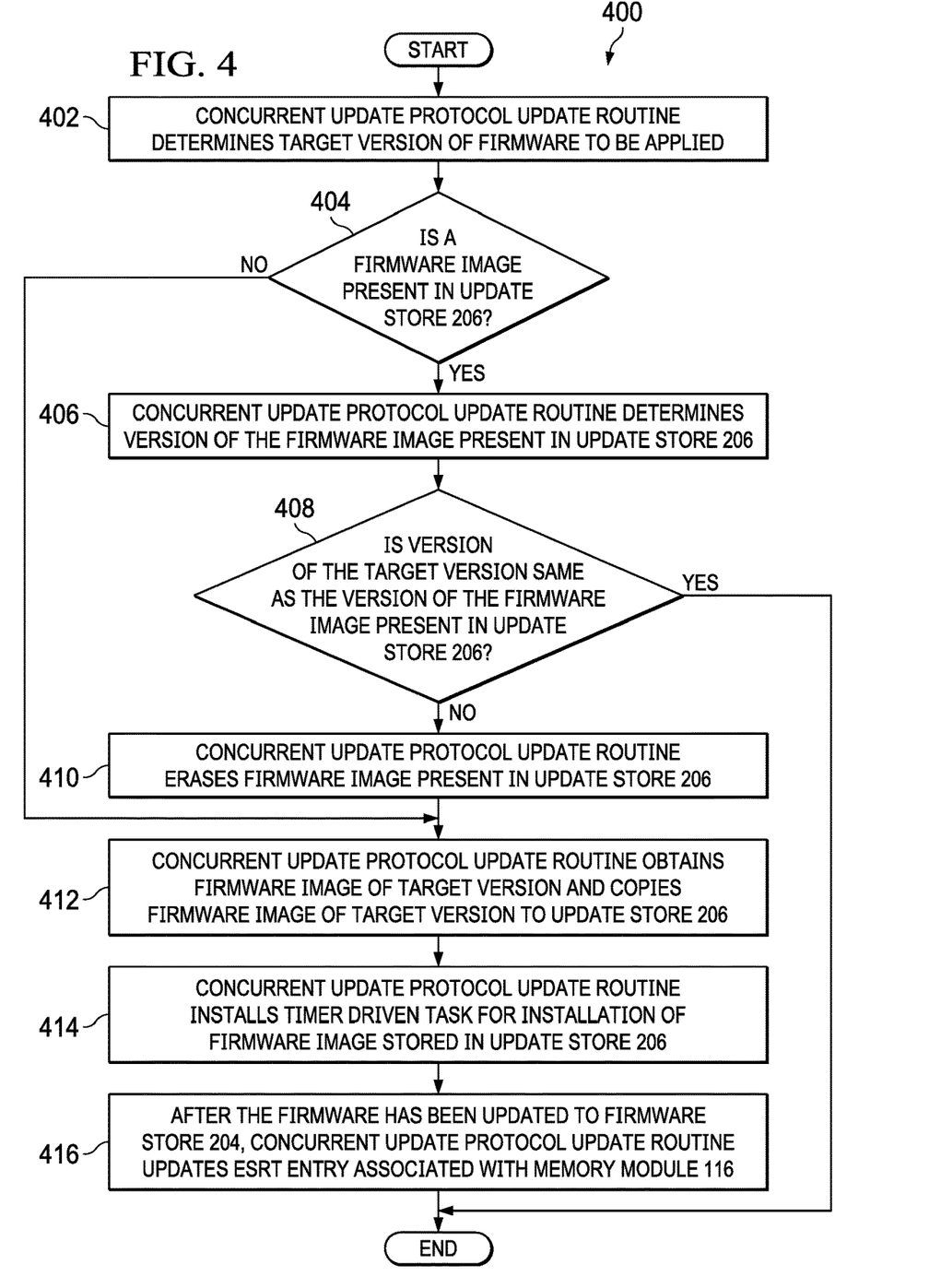
FIG. 4 illustrates a flow chart of an example method for execution of a concurrent update protocol for a memory module, in accordance with embodiments of the present disclosure.

FIG. 4 illustrates a flow chart of an example method 400 for execution of a concurrent update protocol for a memory module 116, in accordance with embodiments of the present disclosure. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, the concurrent update protocol update routine executing on a memory module 116 may determine the version of firmware to be applied, which may be referred to herein as the "target version." At step 404, the concurrent update protocol update routine may determine if a firmware image is present in update store 206. If a firmware image is present in update store 206, method 400 may proceed to step 406. Otherwise, if no firmware image is present in update store 206, method 400 may proceed to step 412.

At step 406, responsive to the firmware image being present in update store 206, the concurrent update protocol update routine may determine the version of the firmware image present in update store 206. At step 408, the concurrent update protocol update routine may determine if the version of the target version is the same as the version of the firmware image present in update store 206. If the versions are the same, method 400 may end. Otherwise, if the versions are different, method 400 may proceed to step 410.

At step 410, responsive to the firmware versions being different, the concurrent update protocol update routine may erase the firmware image present in update store 206.

At step 412, the concurrent update protocol update routine may obtain a firmware image of the target version and copy such firmware image of the target version to update store 206.

At step 414, the concurrent update protocol update routine may install a timer driven task for installation of the firmware image stored in update store 206. Accordingly, upon expiration of a timer associated with the timer driven task, the memory module 116 may load or "pull" the updated firmware image from update store 206 and apply the firmware update to itself, storing the firmware update in update store 206. At step 416, after the firmware has been updated to firmware store 204, the concurrent update protocol update routine may update an ESRT entry associated with the memory module 116. After completion of step 416, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented in whole or part using concurrent firmware update engine 107, and/or any other system operable to implement method 400. In certain embodiments, method 400 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   one or more processors;
   a memory system communicatively coupled to the one or more processors; and
   a program of instructions embodied in non-transitory computer readable media and configured to, when read and executed by the one or more processors, prior to initialization of an operating system of the information handling system, cause a basic input/output system (BIOS) environment of the information handling system to:
      enumerate non-volatile dual in-line memory modules (NVDIMMs) of the memory system;
      determine a plurality of non-empty groups for the enumerated NVDIMMs based on vendor and model information of the NVDIMMs, such that NVDIMMs having a particular vendor and a particular model are grouped together in a respective particular group; and
      for each group, install a concurrent firmware protocol to each of the NVDIMMs in that group, wherein the concurrent firmware protocol is configured to individually execute an update routine on each of the NVDIMMs, the update routine configured to, on each NVDIMM:
         store a to-be-applied firmware update in a protected non-volatile region of the NVDIMM that is not accessible by the operating system, wherein the to-be-applied firmware update is determined based on the group; and
         pull the to-be-applied firmware update from the protected non-volatile region of the NVDIMM and perform a self-update of firmware of the NVDIMM.

2. The information handling system of claim 1, wherein the program of instructions is embodied in and is executed as part of the BIOS of the information handling system.

3. The information handling system of claim 2, wherein the update routine updates a status of a table internal to the BIOS responsive to completion of the self-update of the firmware.

4. The information handling system of claim 1, wherein performing the self-update of the firmware of the NVDIMM comprises installing a timer driven task on the NVDIMM.

5. The information handling system of claim 4, wherein the self-update of the firmware is performed following expiration of a time associated with the timer driven task.

6. A method comprising, in an information handling system comprising one or more processors and a memory system communicatively coupled to the one or more processors:

prior to initialization of an operating system of the information handling system, causing a basic input/output system (BIOS) environment of the information handling system to carry out operations comprising:
enumerating non-volatile dual in-line memory modules (NVDIMMs) of the memory system;
determining a plurality of non-empty groups for the enumerated NVDIMMs based on vendor and model information of the NVDIMMs, such that NVDIMMs having a particular vendor and a particular model are grouped together in a respective particular group; and
for each group, installing a concurrent firmware protocol to each of the NVDIMMs in that group, wherein the concurrent firmware protocol is configured to individually execute an update routine on each of the NVDIMMs, the update routine configured to, on each NVDIMM:
store a to-be-applied firmware update in a protected non-volatile region of the NVDIMM that is not accessible by the operating system, wherein the to-be-applied firmware update is determined based on the group; and
pull the to-be-applied firmware update from the protected non-volatile region of the NVDIMM and perform a self-update of firmware of the NVDIMM.

7. The method of claim 6, wherein the enumerating and installing is performed as part of the BIOS of the information handling system.

8. The method of claim 7, wherein the update routine updates a status of a table internal to the BIOS responsive to completion of the self-update of the firmware.

9. The method of claim 6, wherein performing the self-update of the firmware of the NVDIMM comprises installing a timer driven task on the NVDIMM.

10. The method of claim 9, wherein the self-update of the firmware is performed following expiration of a time associated with the timer driven task.

11. An article of manufacture comprising:
a non-transitory computer-readable medium; and
computer-executable instructions carried on the computer-readable medium, the instructions readable by a processor, the instructions, when read and executed, for causing the processor to, in an information handling system comprising one or more processors and a memory system communicatively coupled to the one or more processors, prior to initialization of an operating system of the information handling system, cause a basic input/output system (BIOS) environment of the information handling system to:
enumerate non-volatile dual in-line memory modules (NVDIMMs) of the memory system;
determine a plurality of non-empty groups for the enumerated NVDIMMs based on vendor and model information of the NVDIMMs, such that NVDIMMs having a particular vendor and a particular model are grouped together in a respective particular group; and
for each group, install a concurrent firmware protocol to each of the NVDIMMs in that group, wherein the concurrent firmware protocol is configured to individually execute an update routine on each of the NVDIMMs, the update routine configured to, on each NVDIMM:
store a to-be-applied firmware update in a protected non-volatile region of the NVDIMM that is not accessible by the operating system, wherein the to-be-applied firmware update is determined based on the group; and
pull the to-be-applied firmware update from the protected non-volatile region of the NVDIMM and perform a self-update of firmware of the NVDIMM.

12. The article of claim 11, wherein the enumerating and installing is performed as part of the BIOS of the information handling system.

13. The article of claim 12, wherein the update routine updates a status of a table internal to the BIOS responsive to completion of the self-update of the firmware.

14. The article of claim 11, wherein performing the self-update of the firmware of the NVDIMM comprises installing a timer driven task on the NVDIMM.

15. The article of claim 14, wherein the self-update of the firmware is performed following expiration of a time associated with the timer driven task.

* * * * *